(12) United States Patent
Lee

(10) Patent No.: US 8,585,025 B2
(45) Date of Patent: Nov. 19, 2013

(54) BODY AMPLITUDE SENSITIVE AIR SPRING

(75) Inventor: Kwang Su Lee, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 97 days.

(21) Appl. No.: 13/248,842

(22) Filed: Sep. 29, 2011

(65) Prior Publication Data

US 2012/0074626 A1  Mar. 29, 2012

(30) Foreign Application Priority Data

Sep. 29, 2010  (KR) ........................ 10-2010-0094302

(51) Int. Cl.
*F16F 9/04*  (2006.01)
(52) U.S. Cl.
USPC .................. 267/64.27; 267/64.15; 267/64.19; 267/64.21; 267/64.24
(58) Field of Classification Search
USPC ...................... 267/64.15, 64.19, 64.21, 64.24
See application file for complete search history.

(56) References Cited

U.S. PATENT DOCUMENTS

| 2,936,860 | A | * | 5/1960 | Peras | 188/298 |
| 2,977,134 | A | * | 3/1961 | Helling | 280/124.157 |
| 4,428,569 | A | * | 1/1984 | Takei | 267/64.27 |
| 4,669,710 | A | * | 6/1987 | Horvat | 267/64.21 |
| 4,871,189 | A | * | 10/1989 | Van Breemen | 267/64.27 |
| 5,509,641 | A | | 4/1996 | Prinzler et al. | |
| 5,624,105 | A | * | 4/1997 | Runkel | 267/64.15 |
| 6,427,986 | B1 | * | 8/2002 | Sakai et al. | 267/64.15 |
| 6,651,787 | B2 | * | 11/2003 | Grundei | 188/280 |
| 2007/0023981 | A1 | * | 2/2007 | Helmling | 267/64.15 |

FOREIGN PATENT DOCUMENTS

| JP | 7-238969 A | 9/1995 |
| JP | 2008-105633 A | 5/2008 |

* cited by examiner

*Primary Examiner* — Robert A Siconolfi
*Assistant Examiner* — Mahbubur Rashid
(74) *Attorney, Agent, or Firm* — McDermott Will & Emery LLP

(57) ABSTRACT

Provided is an air spring for sensing a behavior of a vehicle and varying a spring constant by changing a chamber volume of the air spring, improving the ride comfort and the steering stability according to situations.

An air spring installed in a vehicle to absorb shock from exterior includes: a first body fixed to a vehicle body side of the vehicle; a second body fixed to a wheel side of the vehicle; an air sleeve installed between the first body and the second body to serve as a spring while varying an outer shape thereof according to a change of an internal pressure; and a valve structure for dividing an inner space of the air spring to form a plurality of chambers, and operating by inertia caused by a behavior of the vehicle to selectively connect or block the plurality of chambers.

4 Claims, 3 Drawing Sheets

BODY AMPLITUDE SENSITIVE AIR SPRING

CROSS REFERENCE TO RELATED APPLICATION

This application claims priority from and the benefit of Korean Patent Application No. 10-2010-0094302, filed on Sep. 29, 2010, which is hereby incorporated by reference for all purposes as if fully set forth herein.

TECHNICAL FIELD

The present invention relates to an air spring for absorbing vibration or shock of a vehicle by using compressed air, and more particularly, to an air spring for sensing a behavior of a vehicle and varying a spring constant by changing a chamber volume of the air spring, thereby improving the ride comfort and the steering stability according to situations.

BACKGROUND

In general, a suspension is installed between a lower section of a vehicle body and a wheel axle to absorb and reduce vibration or shock transferred from wheels to the vehicle body. A suspension is provided with a spring and a shock absorber.

In such a suspension, a coil spring or an air spring may be used. In the case of an air suspension having an air spring, a compressor is driven by an engine or a motor, and air compressed by the compressor is stored in a main air tank through a water trap and a check valve. An internal pressure of the main air tank is adjusted to a predetermined range by a pressure regulator. A safety valve is installed at one side of the main air tank in preparation for abnormal air pressure. Air stored in the main air tank is supplied to an air spring of a suspension through an air pipe, a leveling valve, and a surge tank.

A conventional air spring generally has a spring constant that is set to be smaller than that of a coil spring. Accordingly, a natural frequency of a vehicle is lowered, which improves the ride comfort. However, if a spring constant is set to be too small, the vehicle steering stability is deteriorated. As such, there is a tradeoff between two characteristics, i.e., the ride comfort and the steering stability. That is, if one of the two characteristics becomes better, the other becomes worse.

However, a spring constant of a conventional air spring is fixed to a predetermined value. Therefore, if the ride comfort is improved, the steering stability is sacrificed. On the contrary, if the steering stability is improved, the ride comfort is sacrificed.

DISCLOSURE

Technical Problem

An aspect of the present invention is directed to a body amplitude sensitive air spring for increasing a spring constant value by decreasing a chamber volume of an air spring if body amplitude is sensed, and for decreasing a spring constant value by increasing a chamber volume of an air spring if wheel amplitude is sensed, thereby improving the ride comfort and the steering stability according to situations.

Technical Solution

According to an embodiment of the present invention, a body amplitude sensitive air spring, which is installed in a vehicle to absorb shock from exterior, includes: a first body fixed to a vehicle body side of the vehicle; a second body fixed to a wheel side of the vehicle; an air sleeve installed between the first body and the second body to serve as a spring while varying an outer shape thereof according to a change of an internal pressure; and a valve structure for dividing an inner space of the air spring to form a plurality of chambers, and operating by inertia caused by a behavior of the vehicle to selectively connect or block the plurality of chambers.

The valve structure may be installed in the first body having a hollow inside and divide the inner space of the air spring.

The plurality of chambers formed by the valve structure may include: a fixing chamber formed by the valve structure and the first body, a volume of the fixing chamber being fixed; and a working chamber formed by the valve structure, the air sleeve, and the second body, a volume of the working chamber being variable by deformation of the air sleeve.

The valve structure may include: a fixing plate installed at an end of the first body and having a through-hole; a valve body installed in the fixing plate, such that the valve body closes the through-hole when inertia is applied; and an elastic member installed between the fixing plate and the valve body, such that the elastic member separates the valve body from the fixing plate and keeps the through-hole in an open state when inertial is not applied.

The valve body may include: an upper mass and a lower mass for generating a movement due to inertia; and a coupling shaft for coupling the upper mass and the lower mass.

Advantageous Effects

According to the embodiments of the present invention, a body amplitude sensitive air spring is provided with a valve installed within a chamber of an air spring. If necessary, the valve is opened or closed according to a behavior of a vehicle body. If body amplitude occurs, a spring constant value is increased by decreasing the chamber volume of the air spring. If wheel amplitude occurs, a spring constant value is decreased by increasing the chamber volume of the air spring.

Therefore, according to the air spring of the present invention, since the spring constant is variable, the ride comfort and the steering stability can be improved according to situations.

DETAILED DESCRIPTION OF EXEMPLARY EMBODIMENTS

Hereinafter, an air spring according to a preferred embodiment of the present invention will be described in detail with reference to the accompanying drawings.

Body amplitude or wheel amplitude has an influence on the steering stability and the ride comfort. If body amplitude occurs during cornering, acceleration, or braking, the steering stability is badly affected. Therefore, it is necessary to suppress a movement of a vehicle by increasing a spring constant of an air spring. On the contrary, if wheel amplitude occurs, like when a vehicle drives on a rough road or passes a small mound, the ride comfort is badly affected. Therefore, it is necessary to minimize a transfer of a weight to a vehicle body due to a motion of wheels by decreasing a spring constant of an air spring.

An air spring performs a spring operation using the compressibility of air filling an inner chamber. The spring constant of the air spring has a large value if the volume of the chamber is small, and has a small value if the volume of the chamber is large. The spring constant of the air spring can be varied by changing the volume of the inner chamber using the above-described characteristics of the air spring. Therefore, when it is necessary to improve the ride comfort, the volume of the chamber is greatly changed. When it is necessary to improve the steering stability, the volume of the chamber is less changed. In this manner, the air spring according to the present invention can selectively meet the requirements for the ride comfort and the steering stability, depending on situations.

Figure 1:
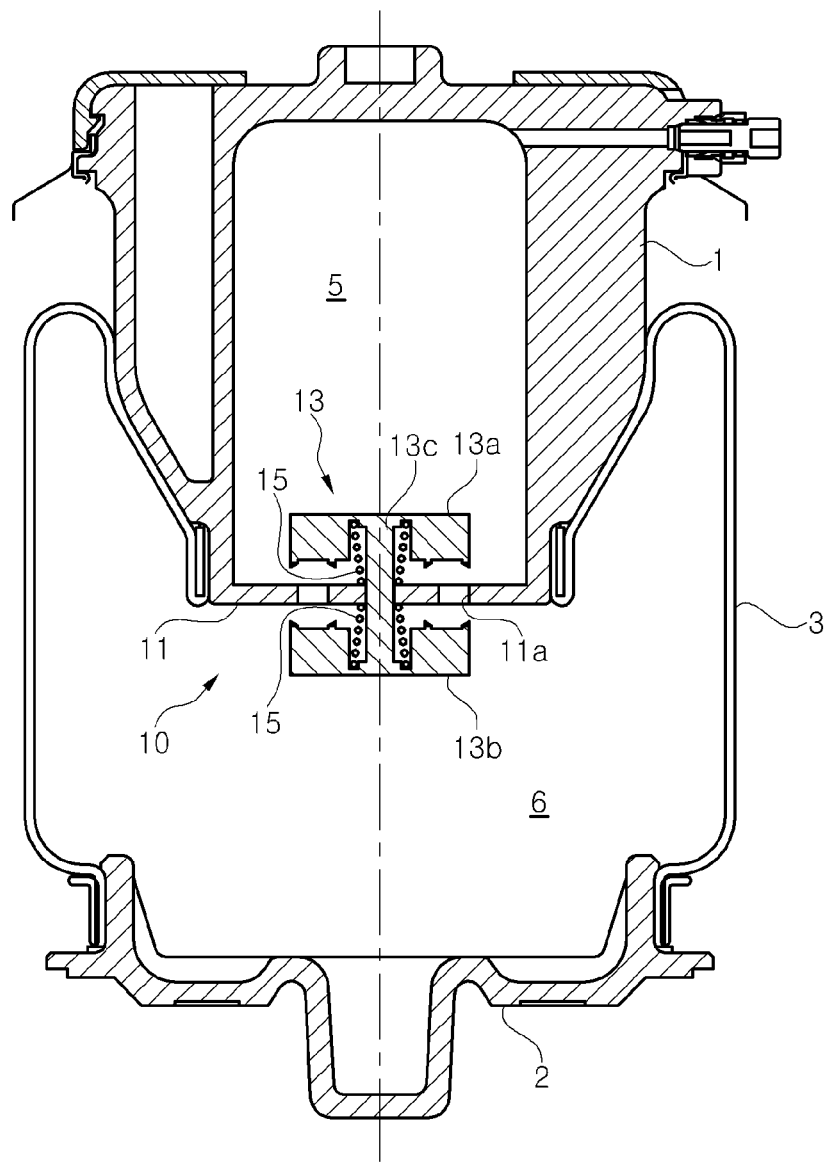
FIG. 1 is a side sectional view of an air spring according to a preferred embodiment of the present invention.

As shown in FIG. 1, an air spring according to a preferred embodiment of the present invention includes a first body 1 fixed to a vehicle body side, a second body 2 fixed to a wheel side, and an air sleeve 3 installed between the first body 1 and the second body 2 and made of a rubber material. The air sleeve 3 made of a rubber material serves as a spring while changing its outer shape according to a change in an internal pressure of the air spring.

The body amplitude sensitive air spring according to the present invention further includes a valve structure for forming a plurality of chambers by dividing the inner space of the air spring. The valve structure is installed in the first body 1 that is fixed to the vehicle body side and has a hollow inside.

The plurality of chambers divided according to the present invention include a fixing chamber 5 having a fixed volume, and a working chamber 6 having a variable volume. The fixing chamber 5 is formed by the valve structure and the inner wall of the first body 1, and the working chamber 6 is formed by the valve structure, the air sleeve 3, and the second body 2. As described above, since the fixing chamber 5 is formed inside the first body 1 that is a rigid body having a fixed shape, the volume of the fixing chamber 5 is fixed. The volume of the working chamber 6 is variable while the air sleeve 3 made of a rubber material is deformed according to the behavior of the wheel side attached to the second body 2.

The valve structure includes a fixing plate 11, a valve body 13, and a pair of upper and lower elastic members 15. The fixing plate 11 is installed at an end of the first body 1 and has one or more through-holes 11a. The valve body 13 is installed in the fixing plate 11 to close the through-holes 11a when inertia is applied. The pair of the upper and lower elastic members 15 are disposed between the fixing plate 11 and the valve body 13 to keep the valve body 13 spaced apart from the fixing plate 11 when no inertia is applied.

The valve body 13 may include an upper mass 13a, a lower mass 13b, and a coupling shaft 13c for coupling the upper mass 13a and the lower mass 13b.

If the valve body 13 comes into contact with the fixing plate 11 and closes the through-hole 11a, the fixing chamber 5 and the working chamber 6 are operated as individual chambers. If the valve body 13 is spaced apart from the fixing plate 11, the fixing chamber 5 and the working chamber 6 are connected together through the through-holes 11a and are operated as a single chamber.

If the fixing chamber 5 and the working chamber 6 are connected together and are operated as a single chamber, an effect that increases the volume of the chamber is achieved. Therefore, the spring constant value of the air spring is decreased. On the contrary, if the fixing chamber 5 and the working chamber 6 are separated from each other and are operated as individual chambers, an effect that decreases the volume of the chamber is achieved. Therefore, the spring constant value of the air spring is increased.

Since the valve structure is connected to the vehicle body side through the first body 1, it is affected by the behavior of the vehicle. Accordingly, if the vehicle body is moved more than a predetermined distance, the valve body 13 having its own mass is moved later than the movement of the vehicle body by inertia. At this moment, a relative movement direction of the valve body 13 and the first body 1, i.e., the vehicle body, is opposite.

Figure 2:
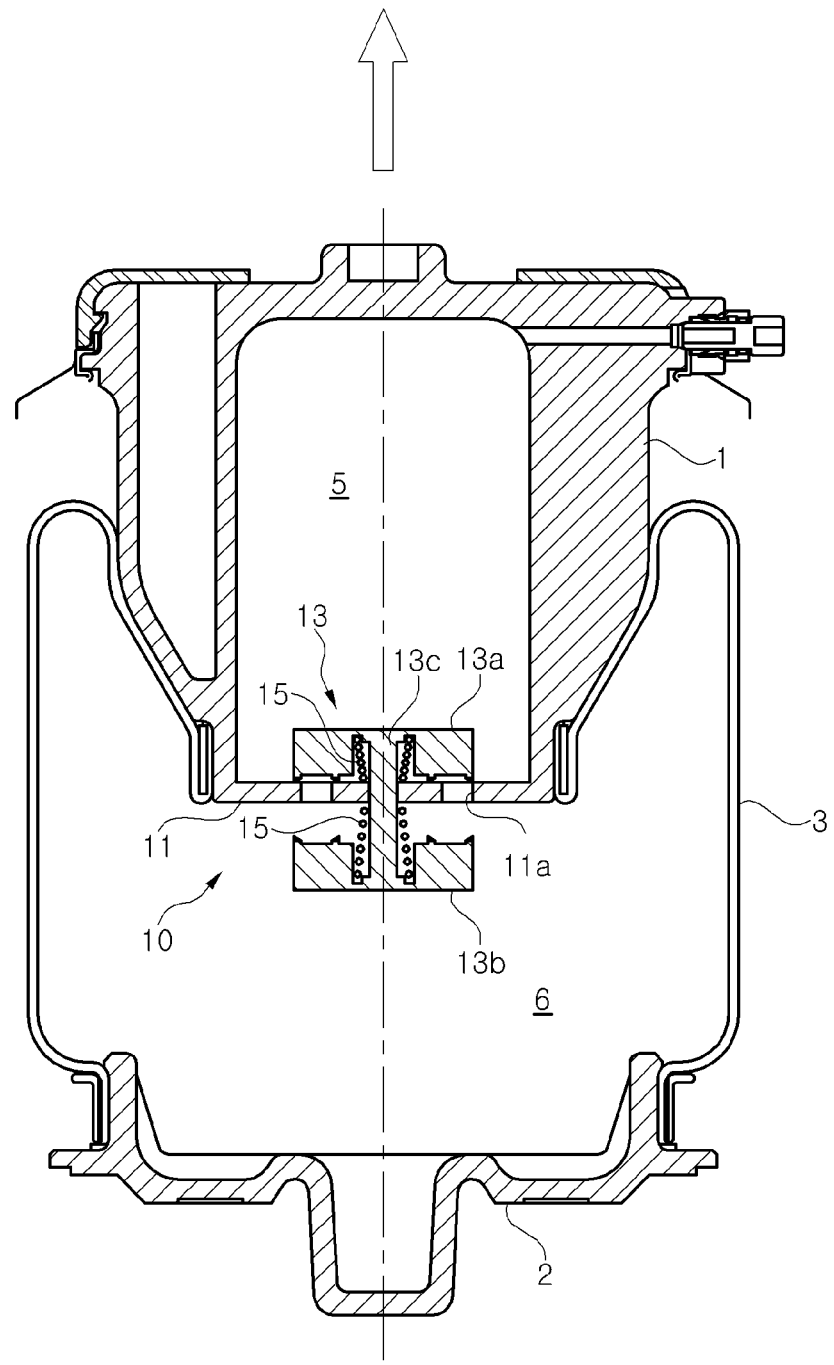
FIGS. 2 and 3 are side sectional views explaining a valve opening and closing of the air spring according to the preferred embodiment of the present invention.

FIG. 2 shows the moment that the vehicle body is moved upward from the ground. Referring to FIG. 2, when the first body 1 is moved upward together with the vehicle body, the valve body 13 is relatively moved downward by inertia. Therefore, the upper mass 13a may come into contact with the fixing plate 11 and close the through-holes 11a.

If the through-hole 11a is closed, the fixing chamber 5 maintains its pressure, but the pressure of the working chamber 6 is lowered due to an increase in the volume of the working chamber 6. Therefore, the upper mass 13a closing the through-holes 11a by the pressure difference may further maintain the closed state.

In addition, if the through-holes 11a are closed, an effect that reduces the inner space of the air spring can be achieved. Thus, a volume change rate is further increased, and the spring constant value is increased. As a result, the upward movement of the vehicle body is suppressed, and the steering stability is improved.

Figure 3:
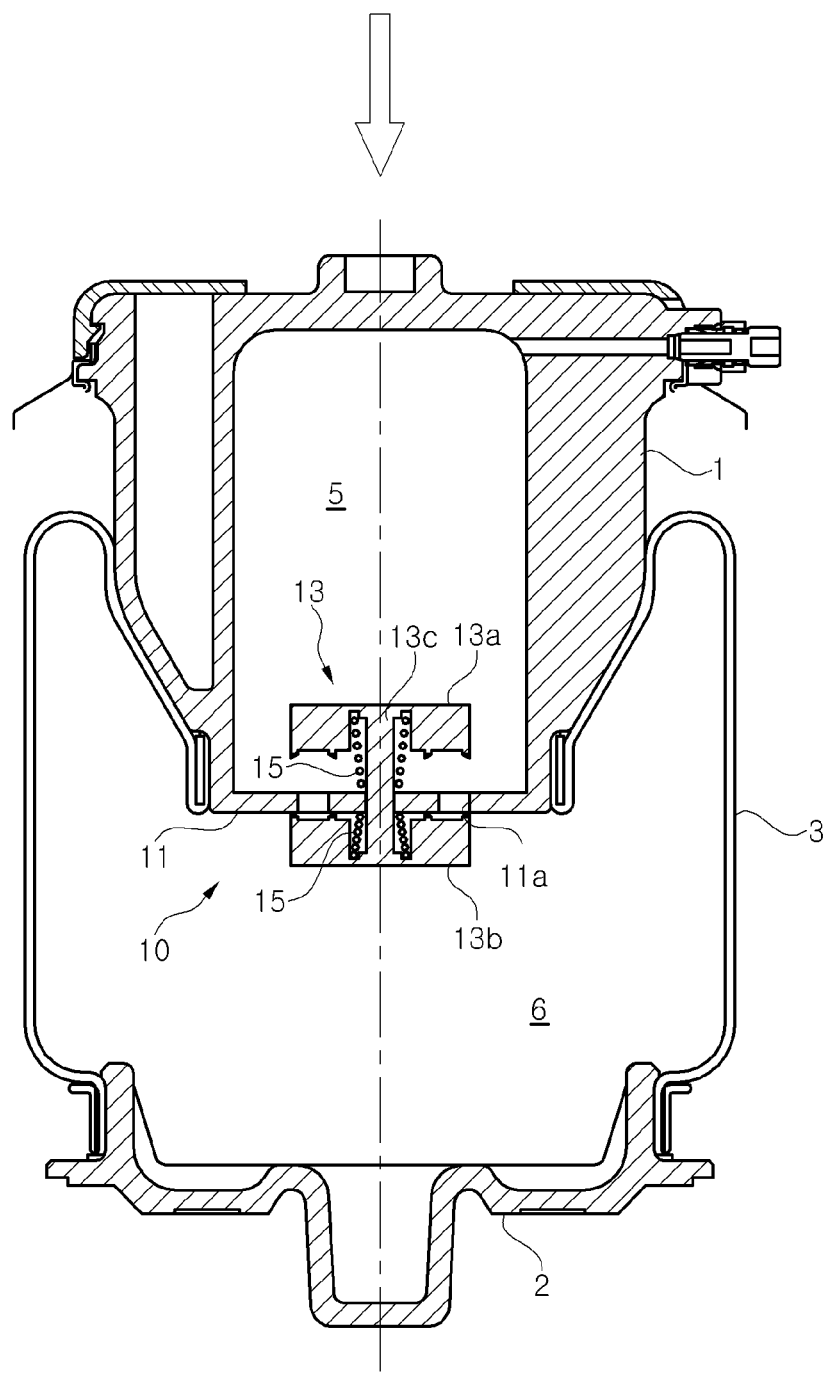

Meanwhile, FIG. 3 shows the moment that the vehicle body is moved downward from the ground. Referring to FIG. 3, when the first body 1 is moved downward together with the vehicle body, the valve body 13 is relatively moved upward by inertia. Therefore, the lower mass 13b may come into contact with the fixing plate 11 and close the through-holes 11a.

If the through-holes 11a are closed, the fixing chamber 5 maintains its pressure, but the pressure of the working chamber 6 is lowered due to an increase in the volume of the working chamber 6. Therefore, the upper mass 13a closing the through-holes 11a by the pressure difference may further maintain the closed state.

In addition, if the through-holes 11a are closed, an effect that reduces the inner space of the air spring can be achieved. Thus, a volume change rate is further increased, and the spring constant value is increased. As a result, the downward movement of the vehicle body is suppressed, and the steering stability is improved.

Unlike the states shown in FIGS. 2 and 3, if the vehicle body side is not moved and only the wheel side is moved, the valve body 13 is not moved by inertia like the initial state shown in FIG. 1. Thus, the fixing chamber 5 and the working chamber 6 are connected together and are operated as a single chamber. Therefore, an effect that increases the volume of the air spring is achieved. Since the spring constant value is small, the ride comfort can be improved.

While the air spring according to the invention has been shown and described with reference to the accompanying drawings, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

| | |
|---|---|
| 1: first body | 2: second body |
| 3: air sleeve | 5: fixing chamber |
| 6: working chamber | 10: valve structure |
| 11: fixing plate | 11a: through-hole |
| 13: valve body | 13a: upper mass |
| 13b: lower mass | 13c: coupling shaft |
| 15: elastic member | |

The invention claimed is:

1. A body amplitude sensitive air spring, which is installed in a vehicle to absorb shock from exterior, the body amplitude sensitive air spring comprising:
a first body fixed to a vehicle body side of the vehicle;
a second body fixed to a wheel side of the vehicle;
an air sleeve installed between the first body and the second body to serve as a spring while varying an outer shape thereof according to a change of an internal pressure; and
a valve structure for dividing an inner space of the air spring to form a plurality of chambers, and operating by inertia caused by a behavior of vehicle to selectively connect or block the plurality of chambers,
wherein the inner space of the air spring comprises a fixing chamber having a fixed volume and a working chamber having a variable volume by deformation of the air sleeve,
wherein the valve structure comprises:
a fixing plate installed at an end of the first body and having a through-hole;
a valve body installed in the fixing plate; and
a pair of upper and lower elastic members installed between the fixing plate and the valve body, and
wherein the valve body extends to the inner space of the fixing chamber and the inner space of the working chamber.

2. The body amplitude sensitive air spring of claim 1, wherein the valve structure is installed in the first body having a hollow inside and divides the inner space of the air spring.

3. The body amplitude sensitive air spring of claim 2, wherein the plurality of chambers formed by the valve structure comprises:
the fixing chamber formed by the valve structure and the first body; and
the working chamber formed by the valve structure, the air sleeve, and the second body.

4. The body amplitude sensitive air spring of claim 1, wherein the valve body comprises:
an upper mass and a lower mass for generating a movement due to inertia; and
a coupling shaft coupling the upper mass and the lower mass.

* * * * *